(No Model.)
G. SYLVIA.
AUTOMATIC STOP FOR MICROMETER GAGES.
No. 487,410. Patented Dec. 6, 1892.
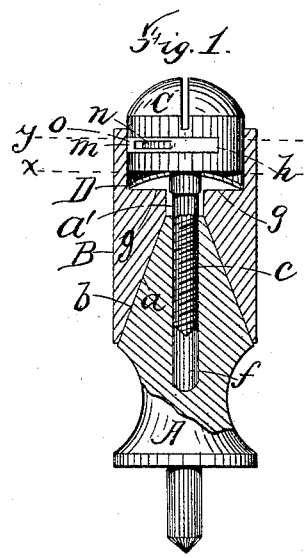
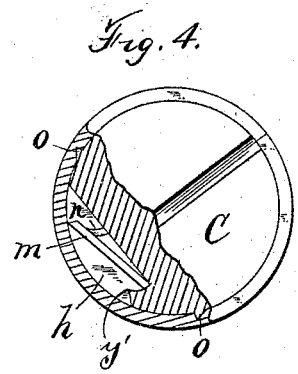
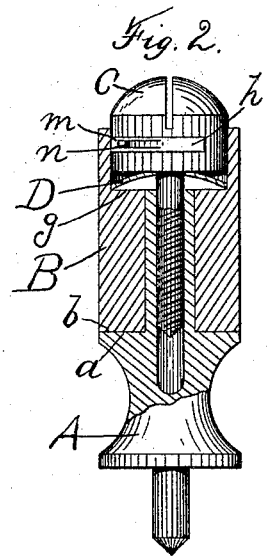
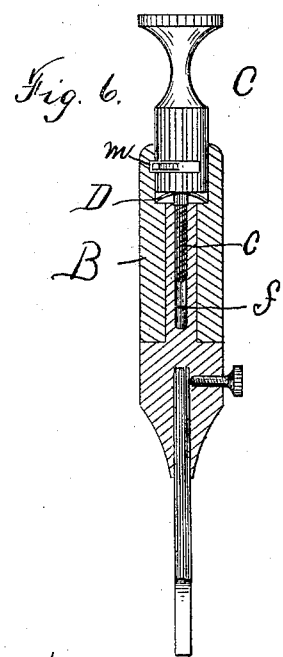
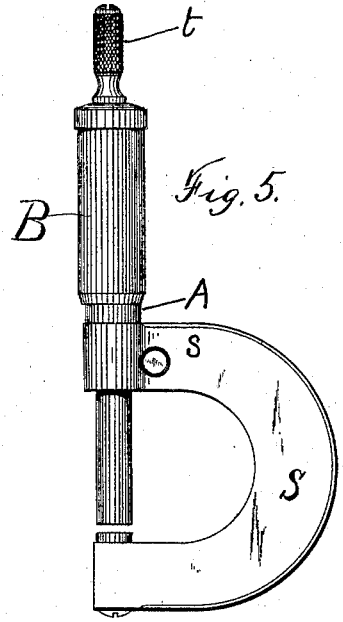
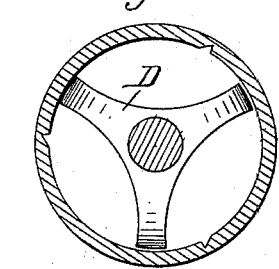
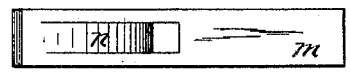
WITNESSES
Chester A. Reed.
F. A. Fernald
INVENTOR
George Sylvia
by J. Foster Bisove.
ATTY

UNITED STATES PATENT OFFICE.

GEORGE SYLVIA, OF WALTHAM, MASSACHUSETTS, ASSIGNOR TO THE BROWN & SHARPE MANUFACTURING COMPANY, OF PROVIDENCE, RHODE ISLAND.

AUTOMATIC STOP FOR MICROMETER-GAGES.

SPECIFICATION forming part of Letters Patent No. 487,410, dated December 6, 1892.

Application filed April 25, 1892. Serial No. 430,464. (No model.)

*To all whom it may concern:*

Be it known that I, GEORGE SYLVIA, a citizen of the United States, residing at Waltham, in the county of Middlesex and Commonwealth of Massachusetts, have invented certain new and useful Improvements in Speed and Automatic Stopping Devices for Micrometer-Gages and other Tools; and I do hereby declare the following to be a full, clear, and exact description of the same, reference being had to the accompanying drawings.

My invention relates more particularly to hand-tools—such as watchmakers' micrometer-gages, calipers, and screw-drivers—in which delicate measurements and the most perfect accuracy and delicacy of adjustment are essential to the best workmanship. The tools now used in watchmaking and the manufacture of delicately-constructed instruments are adjusted with the greatest accuracy and are made to record or to detect the slightest variations in the work to which they are applied; but in the use of such instruments the results are found to be unsatisfactory, because varying according to the different workmen who use them, on account of differences in their nicety of touch, and often in the work of the same workman, according to the care taken by him, and also because with careful workmen much time is consumed in securing the desired accuracy. In the use of the micrometer-gage a slight overpressure upon the measuring ends when in contact with the work will expand or spread the ends apart and produce inaccuracies in the measurement of the work done.

The object of my invention is to overcome these difficulties and defects by providing for micrometer-gages, watchmakers' screw-drivers, and other instruments requiring great delicacy of adjustment a device by which the forward movement of the screw turned by the hand will be stopped automatically when the desired contact has been made with the work for the purpose of measuring the same or in setting the screw or for other similar purposes.

Another object of my invention is to increase the rapidity of the forward movement of the micrometer-gage screw or other forward-moving shaft under the same motion of the hand or fingers as is now used in these instruments as at present constructed.

My invention has also in view the production of means by which the rotating sleeve upon the spindle of the gage or other tool may upon being reversed immediately lock with the spindle and rotate with the same.

My invention consists, essentially, in the certain combination of parts set forth in the claims at the close of this description—namely, a spindle, a sleeve in adjustable frictional contact therewith, means or mechanism by which such frictional contact is adjusted, and means or mechanism by which upon the reverse rotation of said sleeve the same is locked with the spindle, so that the two rotate oppositely together.

My invention also consists in reducing the diameter of the sleeve rotated by the fingers, by which, in connection with the mechanism for automatically stopping the forward movement of the micrometer or other screw, the same can be moved much more rapidly into position than can be safely done with the present devices for advancing the same.

In the drawings, Figure 1 is a longitudinal cross-section of my device. Fig. 2 is a modification of the same. Fig. 3 is a transverse section on the line $xx$, Fig. 1; Fig. 4, a transverse section on the line $y y$, Fig. 1. Fig. 5 is a micrometer-gage with my device attached thereto. Fig. 6 is a watchmaker's screwdriver in longitudinal section, showing the application to the same of my device. Fig. 7 contains two views of the spring-pawl.

A in the drawings represents a spindle, which is adapted to be attached to the micrometer-tip S or other instrument to which it is applied by the stud $s$, or it may be attached thereto in any other usual and suitable manner, or may be made integral therewith, as shown in Fig. 6, where the shank of the screw-driver serves as the spindle, with which are engaged the other parts of the device. The spindle is shaped at one end in the form of the frustum of a cone, the surface of the cone $a$ furnishing a frictional bearing-surface for the engagement of a sleeve to be described, said spindle for a short distance beyond the small end of the cone being cylindrical in form, as shown at $a'$, and has extending through the same the internally-screw-threaded socket $f$ for the reception of the screw-shank $c$ of the adjusting-screw C. Fitted upon and in frictional contact with said spindle A is the sleeve B, by the rotation of which the spindle is moved forward and backward, said sleeve being preferably milled upon its exterior surface to facilitate its rotation when actuated by the fingers of the workman. Its interior contour for the portion thereof intended to engage the spindle is shaped to correspond with the surface of the spindle, as shown at $b$. For the portion extending beyond the end of the spindle the bore is enlarged to form a hollow cylinder, thus making in the sleeve the interior shoulder $g$, such enlargement of the interior of the sleeve being made to provide for the insertion into the sleeve of the head of the screw C, said sleeve being free to revolve about the head of said screw when the former is turned to move forward the spindle and the shaft connected therewith and having in its interior surface opposite to said screw-head one or more longitudinal slots $o\ o$, with which upon the reverse rotation of said sleeve a spring-pawl $m$, seated in the head of said screw C, engages, locking the sleeve to the screw-head, whereby a positive return movement is given to the spindle and the parts to which it is attached.

To regulate the degree of the frictional contact between said sleeve and the spindle, a tension-spring D is seated, with its legs resting upon the shoulder $g$ of the sleeve B. The pressure upon the same and the consequent pressure of the cone-face $b$ of the sleeve B upon the surface $a$ of the spindle A is determined and regulated by the engagement with the upper surface of said tension-spring of the bottom of the head of the adjusting-screw C, the shank of which passes through said spring and engages with the screw-threaded socket in the end of the spindle A. By the adjustment of this screw in the end of the spindle the pressure of the tension-spring aforesaid upon the aforesaid shoulder of the sleeve is regulated, determining the amount of the frictional contact between the sleeve and the spindle.

In the surface of the head of the adjusting-screw C upon the portion thereof adjacent to the interior surface of the sleeve B, which rotates about the same, is the slot $h$, placed transversely to the direction of the movement of said screw. In this slot is seated the spring-pawl $m$, having one end held in place therein by the projection $y'$, under which it rests, and having near the other end the elastic tongue $n$, which extends or is bent downward from said spring $m$, and, lifting the forward end of the spring $m$, presses the latter upward against the adjacent surface of the sleeve B, and which upon the reversal or backward rotation of said sleeve enters one of the slots $o\ o$, locking the screw and sleeve together. The diameter of the sleeve B is made much greater than that of the rosette $t$ or other device for advancing the micrometer or other screw, as is shown in Fig. 5, by which with the same action of the fingers upon the sleeve as is used upon the rosette or other device the screw is advanced much more rapidly, and this can be done with safety, as the stopping of the forward movement of the screw is done automatically, as can be readily understood from the description of the construction of the parts already given.

In the operation of this device the frictional contact between the sleeve and the spindle is adjusted by the screw in the end of the spindle, as may be desired. Then the operator by rotating the sleeve moves forward the micrometer-screw or other screw until the bearing of its forward end upon the work equals the frictional pressure between the sleeve and the spindle. Upon a further turning of the sleeve the frictional contact between it and the spindle yields to the greater pressure upon the end of the screw and the sleeve rotates upon the spindle without advancing the screw. Upon reversing the movement of the sleeve it becomes locked with the spindle and moves the end of the micrometer-screw or other screw away from the work.

I do not wish to limit myself to the construction shown, as it is obvious that various modifications may be readily devised. Fig. 2 represents such modification, wherein place of the cone-shaped spindle the same is made cylindrical with a square shoulder for the frictional contact with the sleeve; also, it is obvious that in place of the triangular tension-spring other forms of springs or any suitable elastic device accomplishing the same object may be employed.

Having thus described the construction in which I practically carry out my improvement, I will now particularly point out in claims those features which I deem to be new and desire to protect by Letters Patent.

I claim—

1. In a micrometer-gage, a spindle provided with a tapering end, a sleeve fitting upon said tapering end, and a tension device whereby the interior wall of said sleeve is brought to bear with such force upon the exterior wall of the spindle that normally the rotation of one necessitates the rotation of the other, substantially as described.

2. In a micrometer-gage, a spindle provided with a tapering end, a sleeve fitting upon said tapering end, and a spring between the spindle and the sleeve, whereby the interior wall of the sleeve is brought to bear with such force upon the exterior wall of the spindle that normally the rotation of one necessitates the rotation of the other, substantially as described.

In witness whereof I have hereunto set my hand.

GEORGE SYLVIA.

Witnesses:
HENRY O. STEARNS,
ROBERT L. HASTINGS.